(12) United States Patent
Boissier et al.

(10) Patent No.: US 6,959,124 B2
(45) Date of Patent: Oct. 25, 2005

(54) LIQUID CRYSTAL-BASED ELECTRO-OPTICAL DEVICE FORMING, IN PARTICULAR, A SWITCH

(75) Inventors: Alain Boissier, Le Roi (FR); Jean-Francois Legay, Le Mesnil Saint Denis (FR); Olivier Duhem, Bretigny sur Orge (FR); Philippe Martinot-Lagarde, Marcousis (FR)

(73) Assignee: Nemoptic, Magny les Hameaux (FR)

( * ) Notice: Subject to any disclaimer, the term of this patent is extended or adjusted under 35 U.S.C. 154(b) by 0 days.

(21) Appl. No.: 10/481,224

(22) PCT Filed: Jun. 13, 2002

(86) PCT No.: PCT/FR02/02026

§ 371 (c)(1),
(2), (4) Date: Dec. 15, 2003

(87) PCT Pub. No.: WO02/103443

PCT Pub. Date: Dec. 27, 2002

(65) Prior Publication Data

US 2004/0202398 A1 Oct. 14, 2004

(30) Foreign Application Priority Data

Jun. 15, 2001 (FR) .......................................... 01 07917

(51) Int. Cl.[7] .............................................. G02B 6/00
(52) U.S. Cl. ............................................. 385/11; 385/6
(58) Field of Search ................................. 385/2, 4, 6, 8, 385/11; 349/201

(56) References Cited

U.S. PATENT DOCUMENTS 4,095,869 A * 6/1978 Reichelt et al. ............. 349/201

FOREIGN PATENT DOCUMENTS

| JP | 62145224 | 6/1987 |
| JP | 01140124 | 6/1989 |

OTHER PUBLICATIONS

Willson et al. "A Liquid Crystal Cutt–Off Modulator for Multimode Optical Waveguides", Optik, 1984, West Germany, vol. 67, No. 1, pp. 37–41.*

Wilson T. et al., "A liquid cut–off modulator for multimode optical waveguides", Optik, 1984, West Germany, vol. 67, No. 1, pp. 37–41.

Bao Xue Chen et al., "High–contrast channel waveguide switch with two sections of a nematic liquid crystal covering", Applied Optics, Washington, US, vol. 32, No. 30, Oct. 20, 1993, pp. 6018–6021.

Okamura Y. et al., "Electrooptic leaky waveguides using namtic liquid crystal", 9th European Conference on Optical Communication, Geneva, Switzerland, Oct. 23–26, 1983, pp. 213–216.

* cited by examiner

Primary Examiner—Phan T. H. Palmer
(74) Attorney, Agent, or Firm—Blakely Sokoloff Taylor & Zafman

(57) ABSTRACT

The present invention provides an electro-optical device, characterized in that it comprises two plane optical substrates (100) each having at least one optical waveguide (110), and a nematic liquid crystal (200) inserted between them, in which the liquid crystal (200) is split into two separate active zones (210, 220) serving to control coupling/decoupling of a respective one of the TE and TM polarizations of a light signal injected into the waveguides (110).

23 Claims, 11 Drawing Sheets

FIG_1

FIG_2

FIG_4
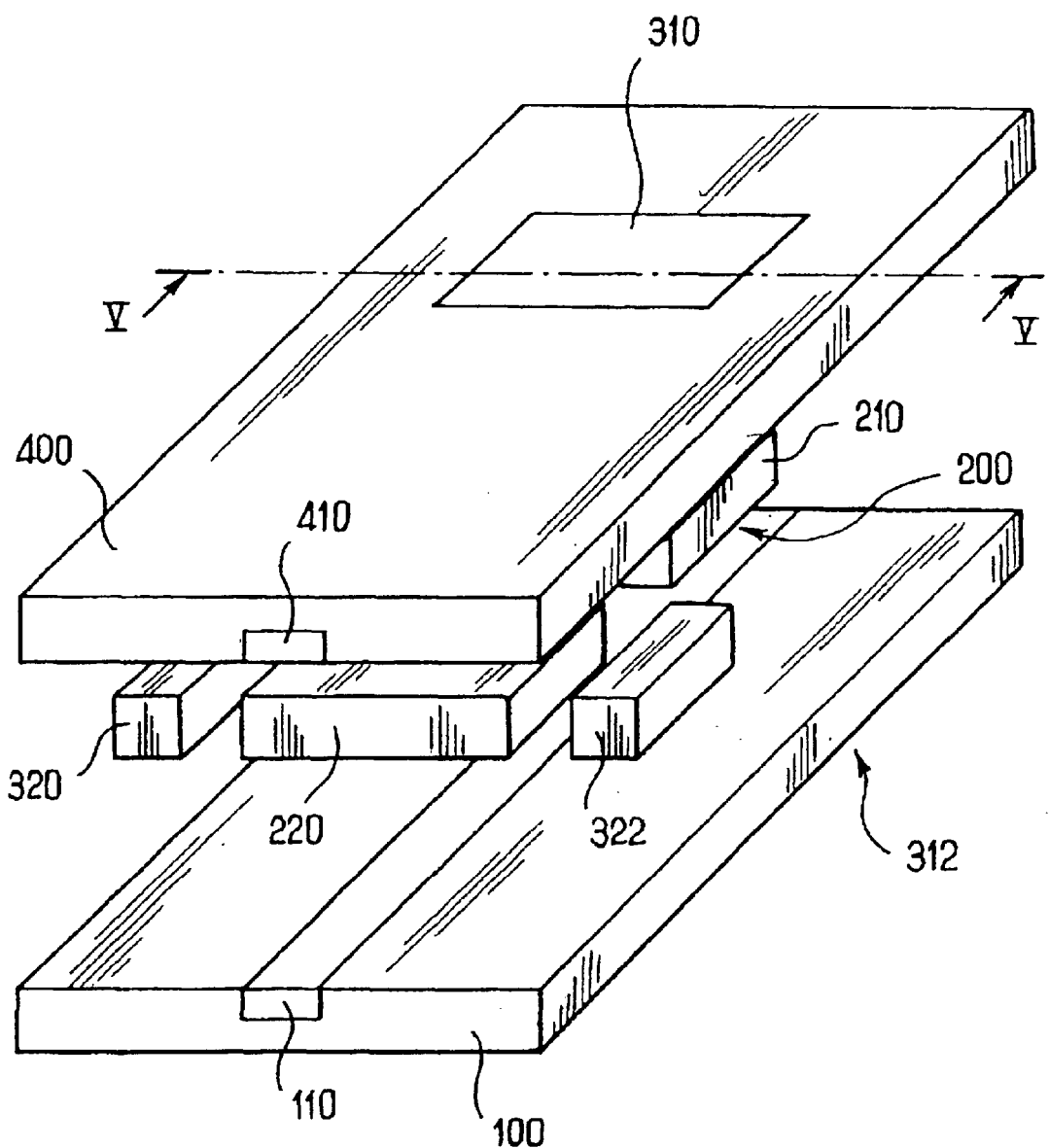

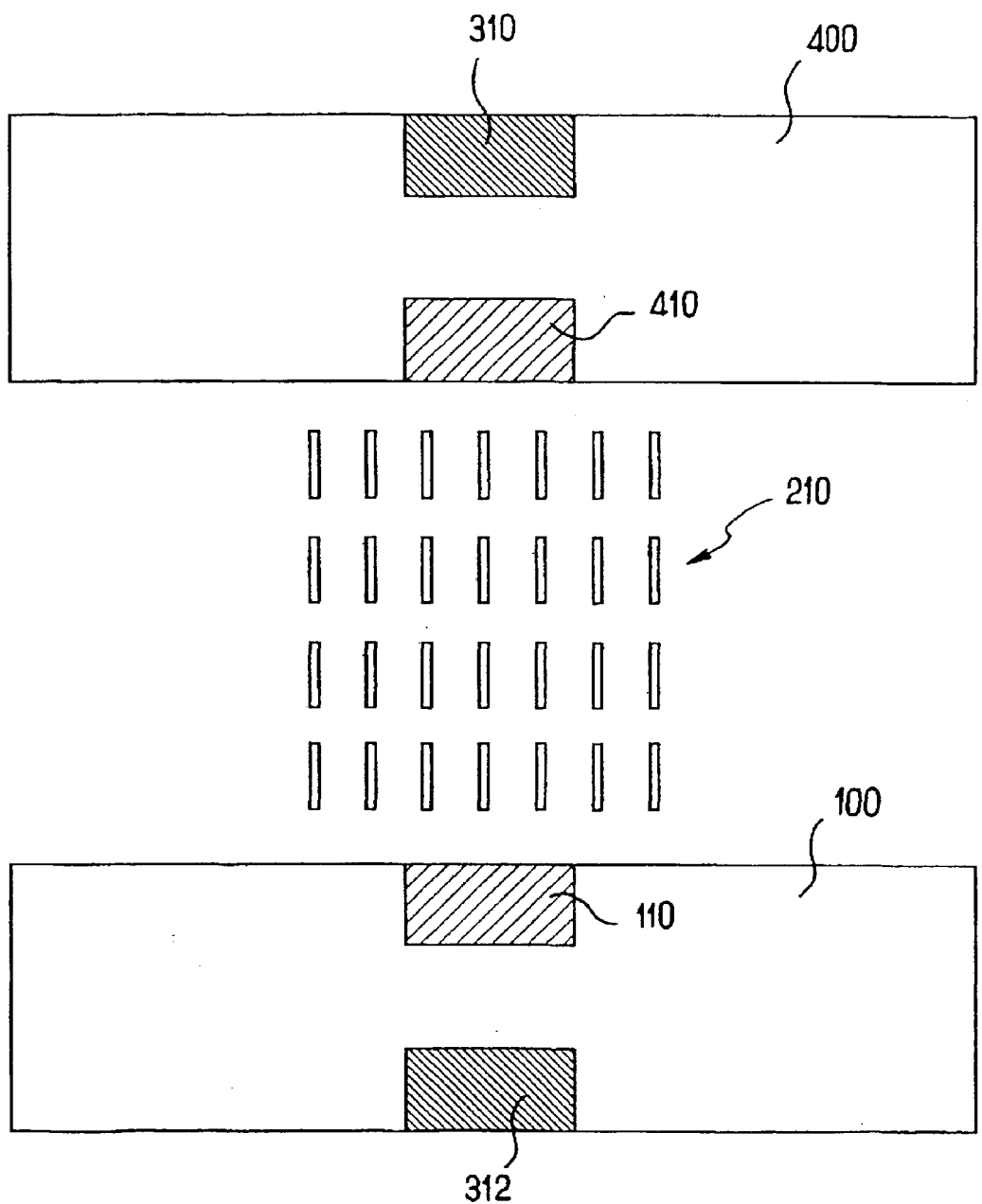

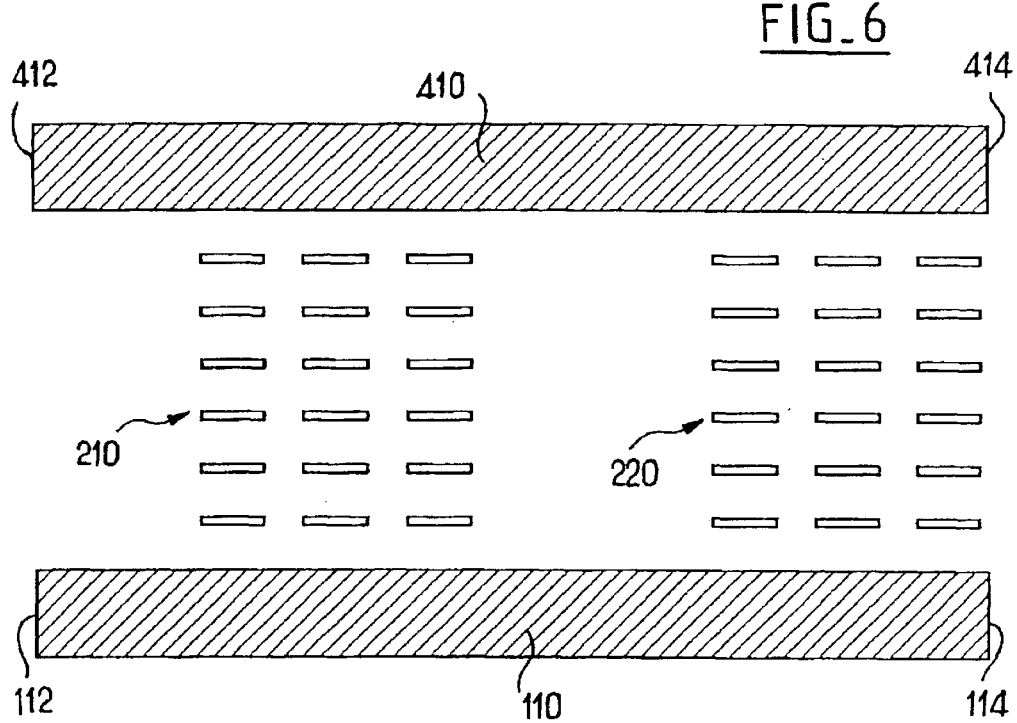
FIG_6
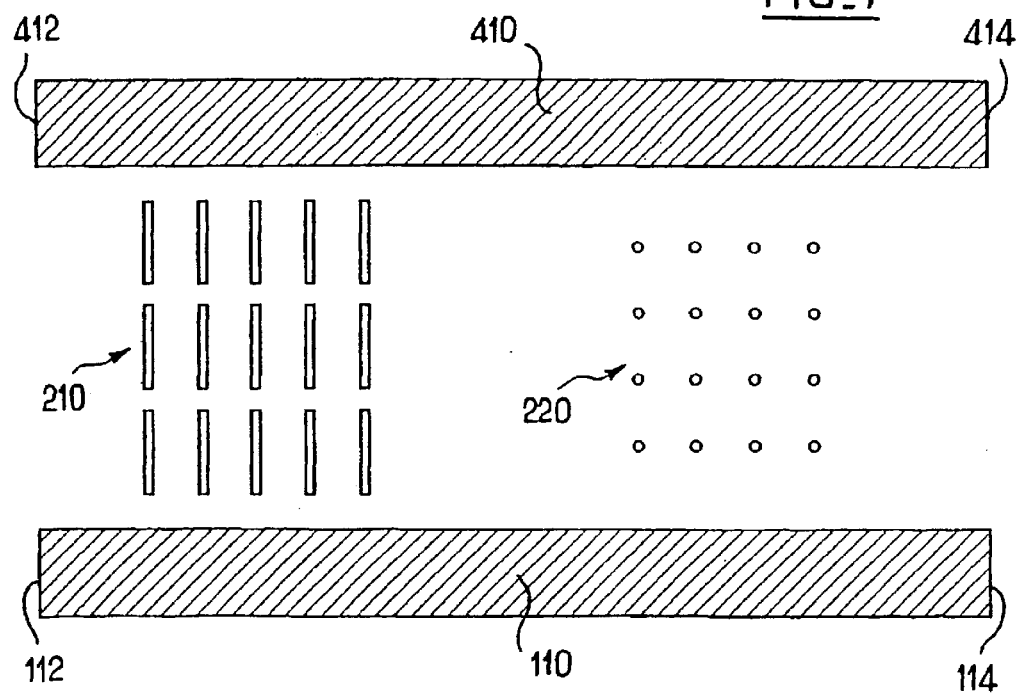
FIG_7

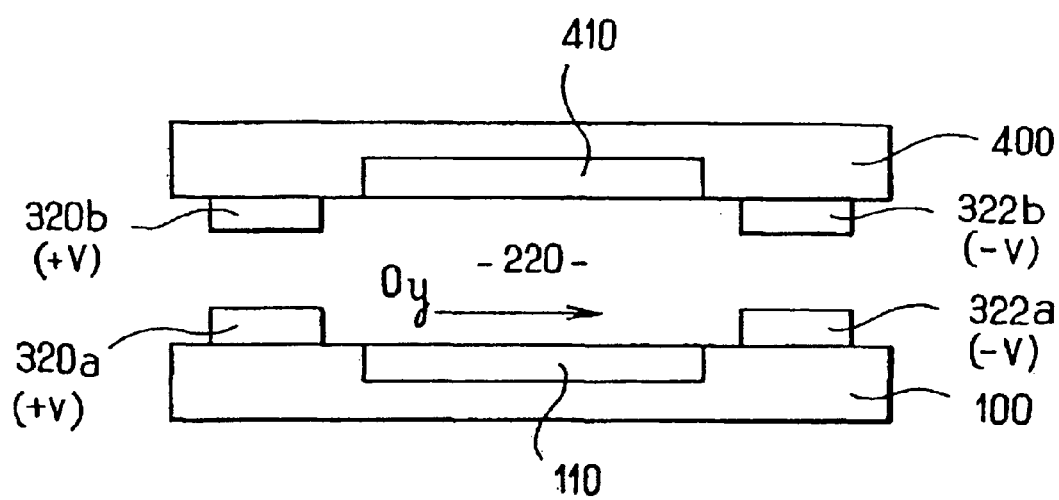
FIG_8
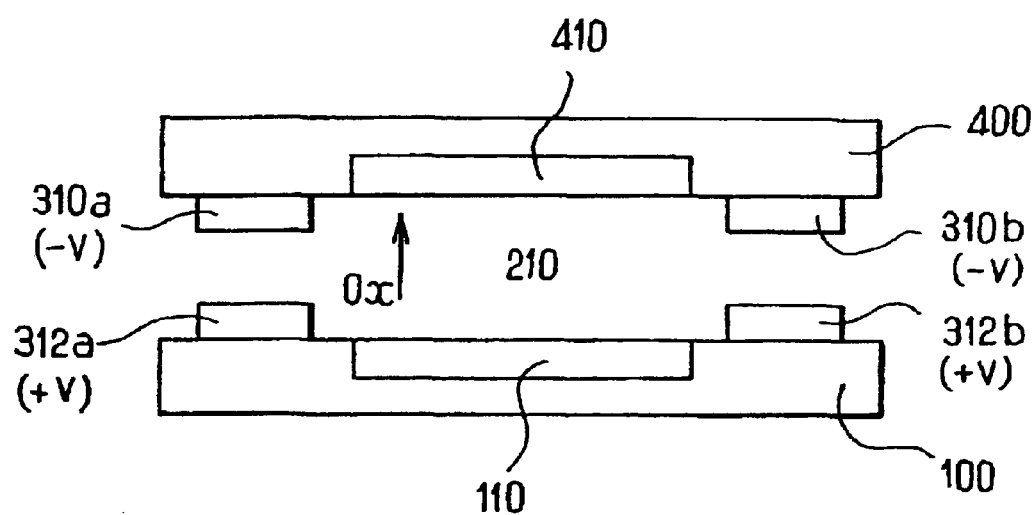
FIG_9

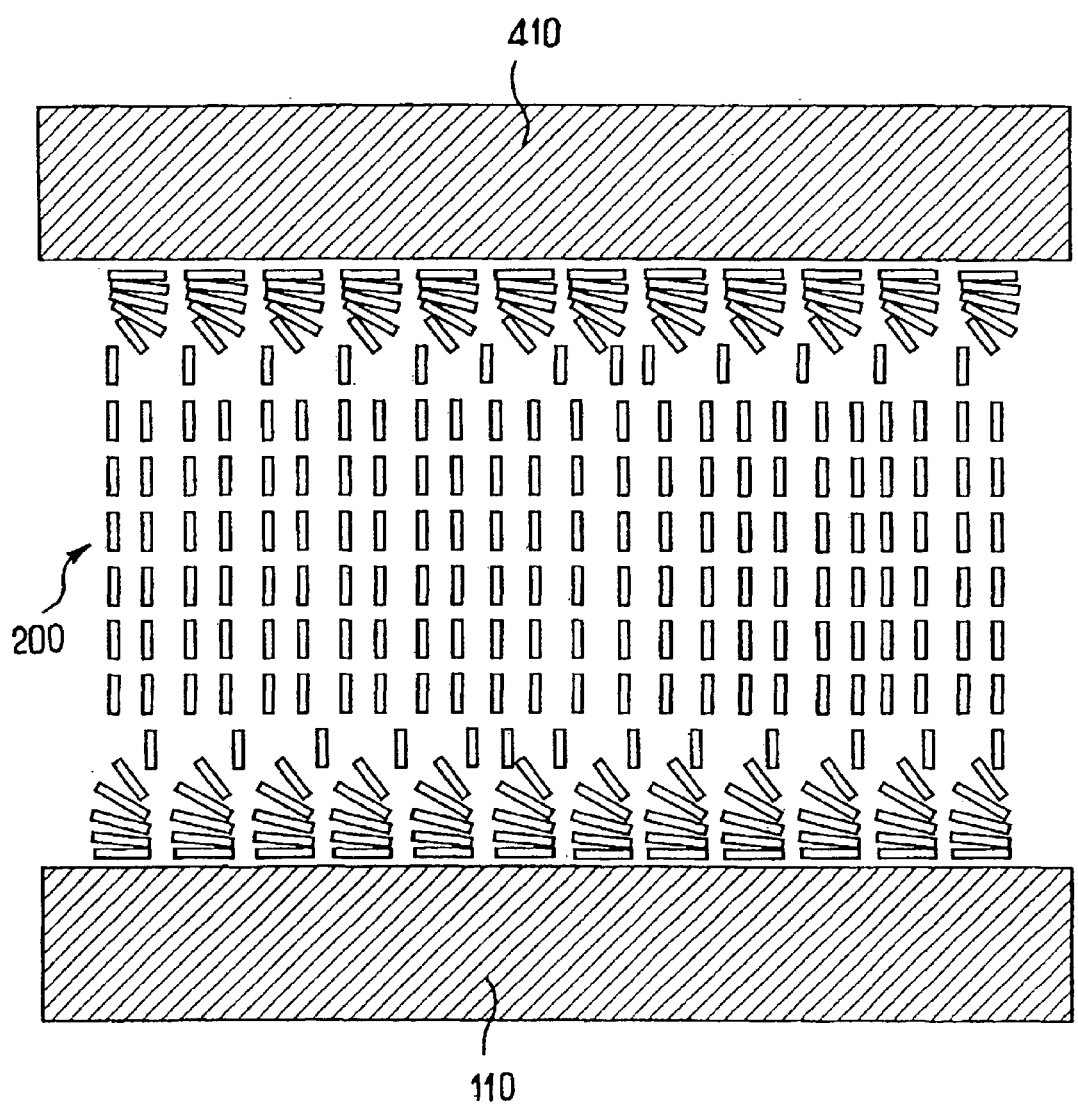
FIG_10

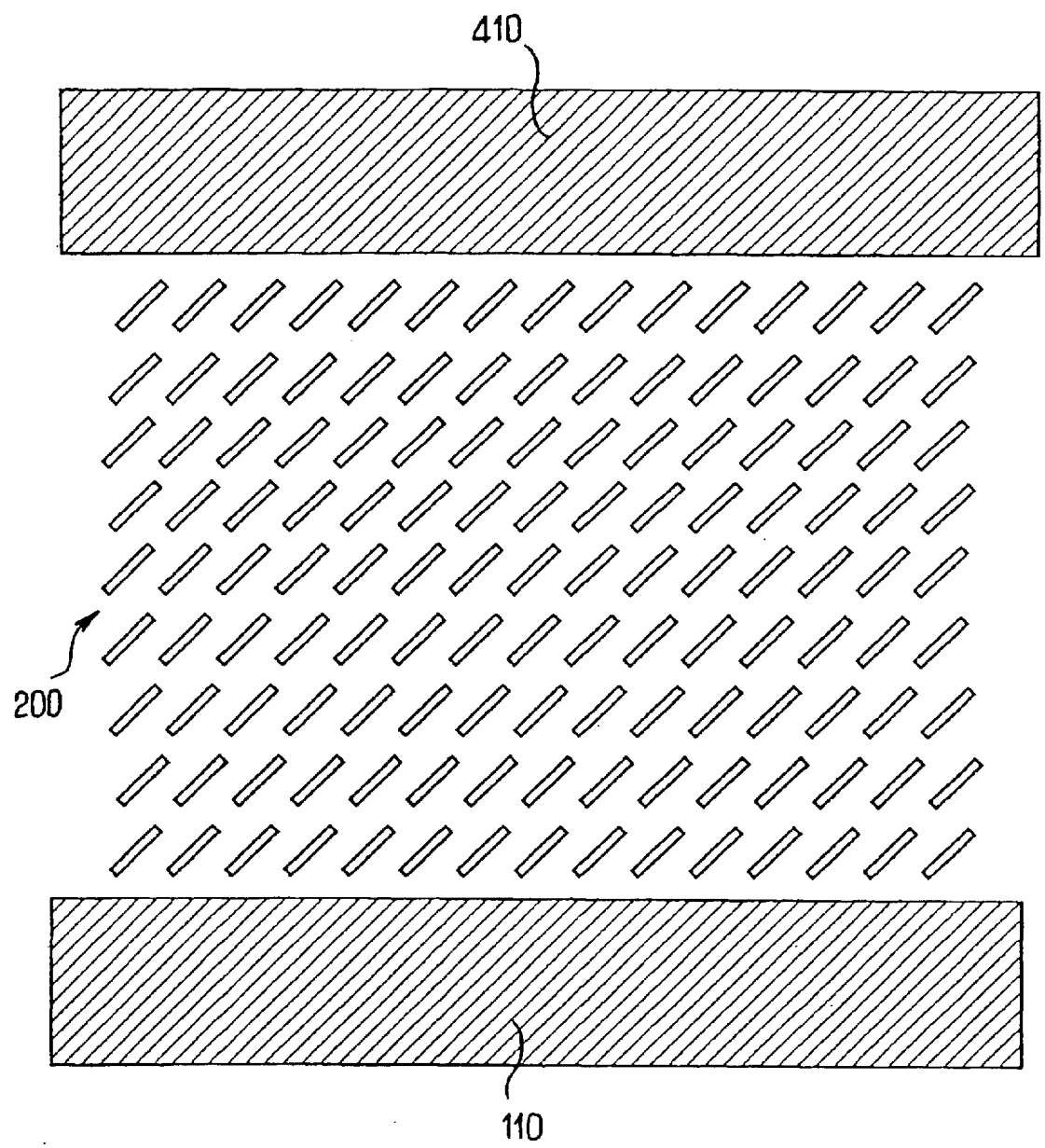

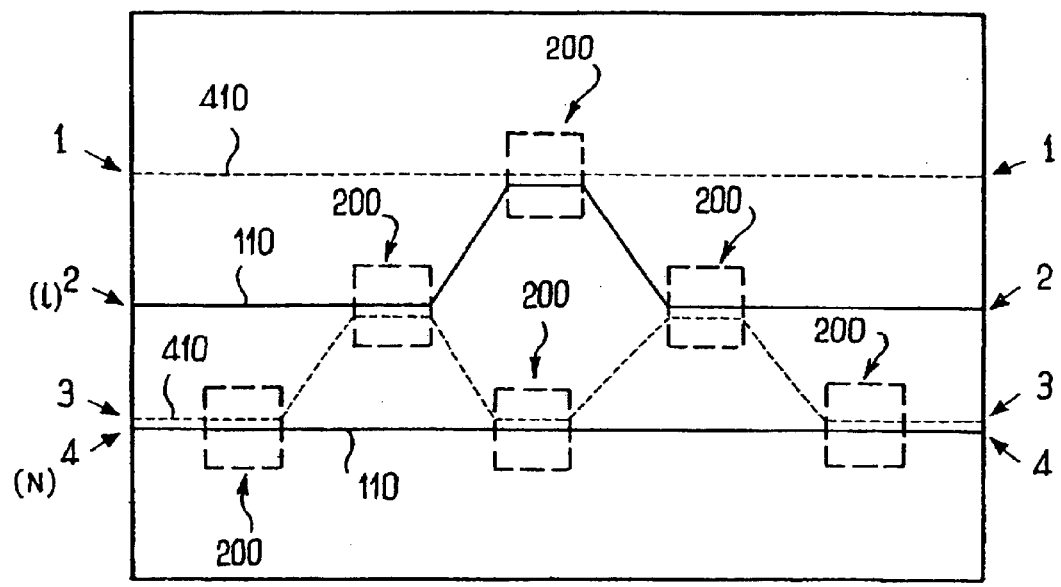
FIG_12
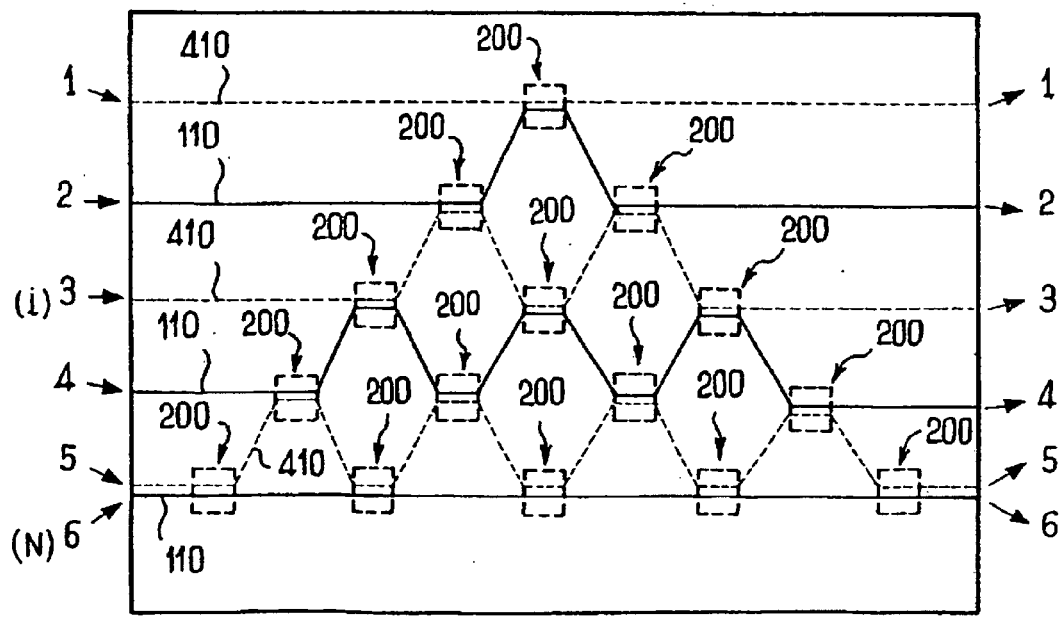
FIG_13

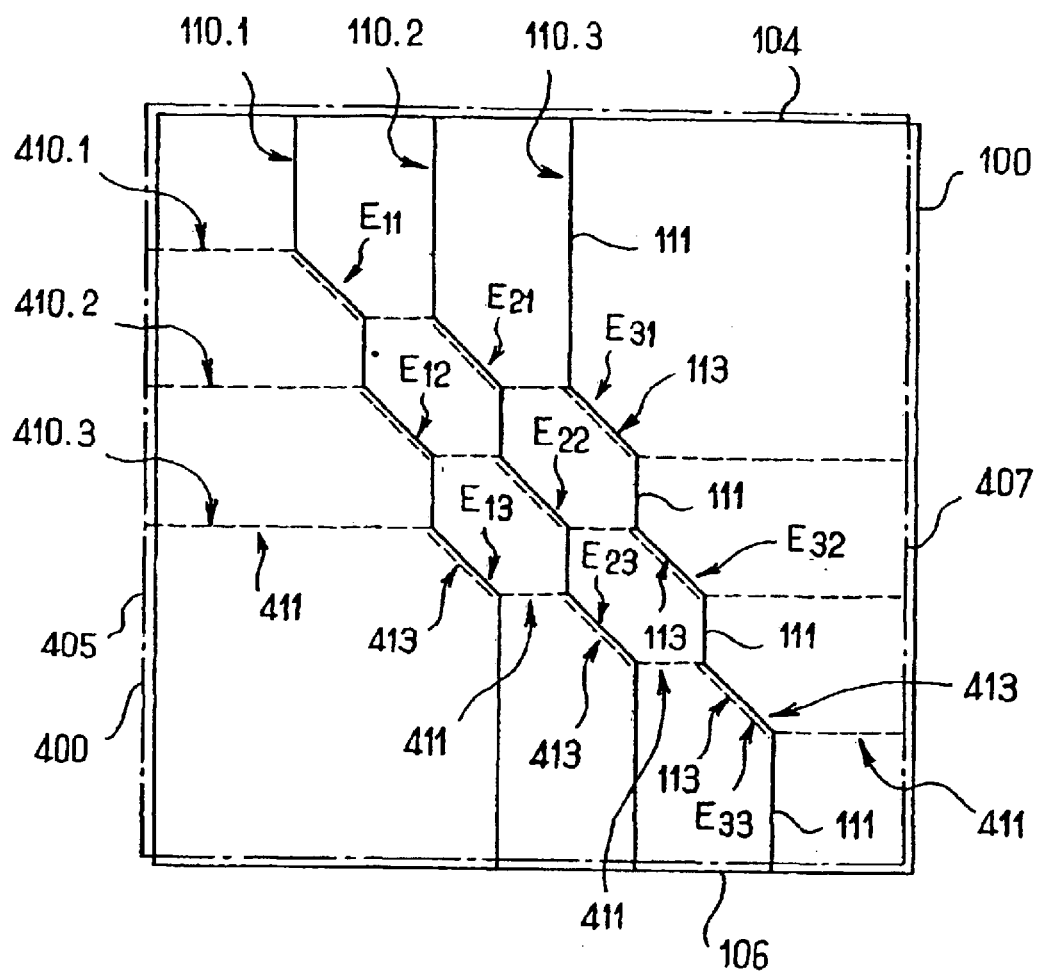
FIG_14

LIQUID CRYSTAL-BASED ELECTRO-OPTICAL DEVICE FORMING, IN PARTICULAR, A SWITCH

The present patent application is a non-provisional application of International Application No. PCT/FR02/002026, filed Jun. 13, 2002.

The present invention relates to the field of switching optical signals.

More precisely, the present invention preferably applies to switching wavelength division multiplexed (WDM) signals propagating between optical ports, e.g. in optical fibers.

The present invention seeks to design an N×P optical switch where N and P are integers, and where N and P may optionally be equal.

The appearance of WDM signals several years ago in optical communications has required new optical components to be developed to enable broad spectrum bands to be processed.

One of the most critical components is an optical switch enabling optical signals coming from a plurality of inlet ports or fibers to be routed to different outlet ports or fibers.

In the past, such routing was performed via optoelectronic converters. Unfortunately, electronic conversion can process only a single wavelength and is therefore incompatible with WDM transmission (80 propagated wavelengths at present, 160 in the near future).

This has led to numerous suppliers specialized in the field of telecommunications to develop all-optical switches, i.e. switches in which the switching process is entirely optical.

Amongst such all-optical switches, micro-electrical mechanical systems (MEMS) have undoubtedly attracted the most enthusiasm in the telecommunications community ([1] MEMS based photonic switching in communication networks, by Dr. Anis Husain, OFC 2001 Proceedings, Paper WX1-1). They operate on the principle of activating silicon micromirrors and they can be used to build switching matrices of any size (from 1×2 ports to 4000×4000 ports). Although their performance in terms of coupling, insertion losses, switching time, and cross-talk are very good, MEMS suffer from a high degree of technological complexity associated with making silicon micromirrors and with the large number of such mirrors in matrices having a large number of ports.

Other optical switching technologies have been developed in parallel, such as thermo-optical switching, ink bubble switches, or liquid crystal switches.

The two first-mentioned of those technologies use integrated optical solutions: thermo-optical switches make use of the thermo-optical effect generated in a Mach-Zehnder interferometer built using planar optics, while ink bubble switches use the total reflection caused by locally heating bubbles of ink placed at the intersections between a plurality of plane optical waveguides ([2] U.S. Pat. No. 6,212,308). Although those technologies present the advantage of using solutions that are optically fully integrated, they generally do not present good stability with respect to temperature or time.

Presently developed liquid crystal technologies use the polarization rotation that is induced by propagating optical signals through a liquid crystal cell ([3] U.S. Pat. No. 6,134,358). Unfortunately, the operation of those switches requires different polarizations to be processed separately, thereby complicating the overall optical design of such a component. A second drawback is due to the fact that constructing an N×P matrix having a large number of ports can be envisaged only by using a plurality of liquid crystal cells in cascade, which implies a great increase in insertion losses with increasing number of matrix ports.

An object of the present invention is to propose novel optical switching means making it possible in particular to overcome the drawbacks associated with separate processing for different polarizations.

An auxiliary object of the present invention is to propose means enabling an optical signal to be attenuated progressively in controlled manner between at least one inlet port and one outlet port.

In the context of the present invention, this object is achieved by an electro-optical device comprising two plane optical substrates each having at least one optical waveguide, and a nematic liquid crystal inserted between them, in which the liquid crystal is split into two separate active zones serving to control coupling and decoupling of a respective one of the TE and TM polarizations of a light signal injected into the waveguides.

According to an advantageous characteristic of the present invention, the device has two pairs of electrodes associated with respective ones of the two active liquid crystal zones, the electrodes in each pair being disposed on respective opposite sides of the waveguide, and the orientations of the electrodes being mutually orthogonal from one pair to the other.

Other characteristics, objects, and advantages of the present invention appear on reading the following detailed description with reference to the accompanying drawings, given as non-limiting examples, and in which:

FIG. 4 is a diagrammatic perspective view of a switch in accordance with the present invention;

FIG. 5 is a cross-section view of the switch on the section plane referenced V—V in FIG. 4, the device being shown in its activated position;

FIG. 6 is a longitudinal section view of the switch, in the rest state;

FIG. 7 is a similar longitudinal section view of the switch in the activated state;

FIGS. 8 and 9 are two cross-section views respectively on section planes referenced VIII—VIII and IX—IX in FIG. 1 showing a preferred embodiment, and thus showing a specific way of implanting electrodes;

FIG. 10 is a detailed section view of the device revealing a buffer layer (coherent length) of liquid crystal at the interfaces;

FIG. 11 is a diagrammatic section view of the device in a control state suitable for imparting an optical attenuation effect; and FIGS. 12, 13, and 14 are diagrams showing three possible embodiments of switches in accordance with the present invention.

The device of the present invention is made using integrated optics and it makes use of the ability of a liquid crystal placed between two substrates to be reoriented electrically.

The switch of the present invention is made using integrated optics and it makes use of the ability of a liquid crystal placed between two plane substrates to be reoriented electrically.

In the context of the present invention, the inlet and outlet ports are preferably embodied by optical fibers. Nevertheless, in a variant, the inlet ports may be formed by any equivalent light emitter; similarly, the outlet ports may be formed by any equivalent light receiver.

Figure 1:
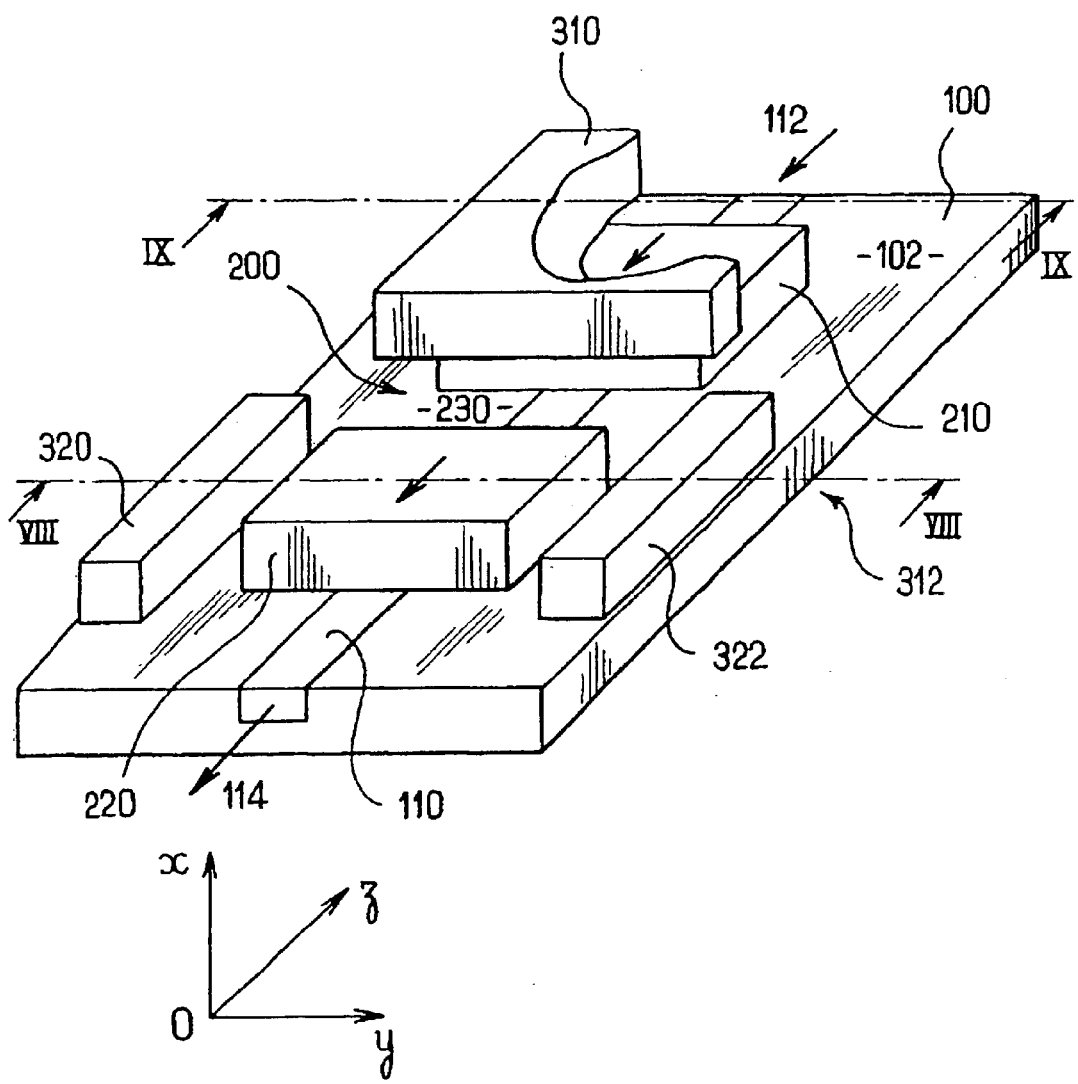
FIG. 1 is a diagrammatic perspective view showing the basic structure of a device in accordance with the present invention.
Figure 2:
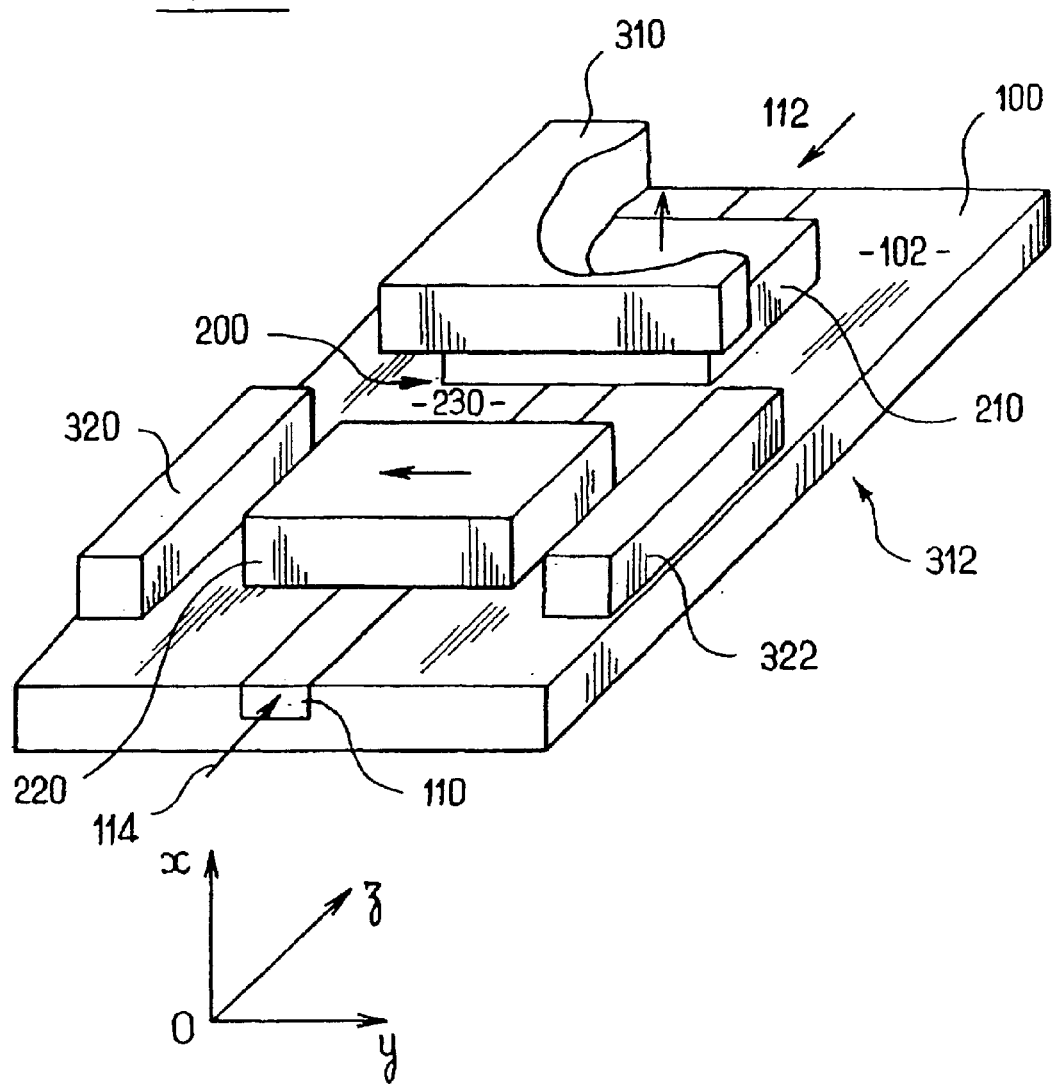
FIG. 2 is a similar view of the device, in its position when activated by applying an electric field.
Figure 3:
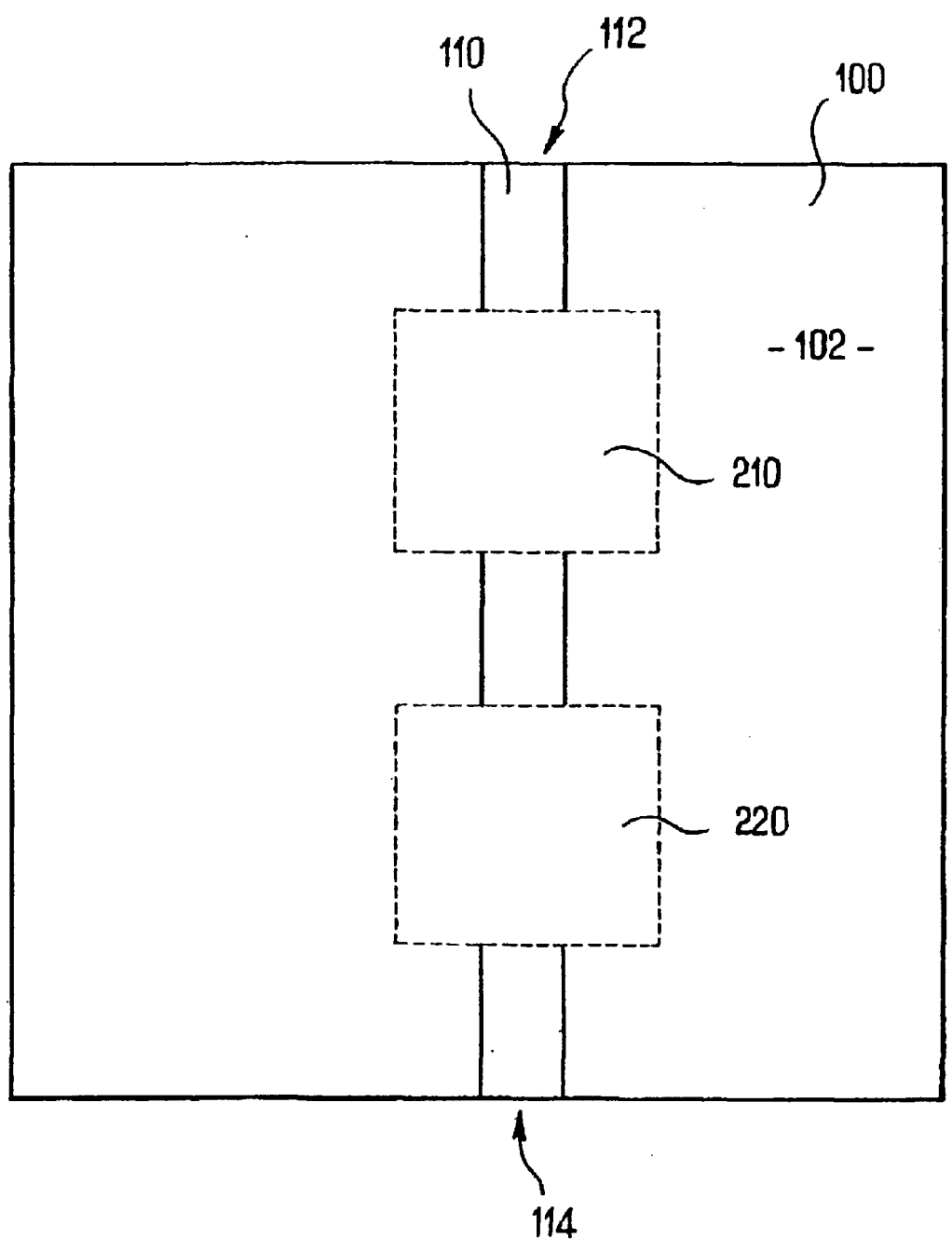
FIG. 3 is a plan view of the substrate and shows the positions of the active liquid crystal and optical signal zones.

The basic structure of the electro-optical device in accordance with the present invention as shown in FIGS. 1 to 3 is described initially.

This basic structure comprises:

a plane substrate 100 possessing an optical waveguide 110;

a nematic liquid crystal material 200 placed against the substrate 100 in the form of two separate active zones 210 and 220; and at least one pair of electrodes 310 & 312 and 320 & 322 associated with each active zone 210, 220 of the liquid crystal 200 and placed respectively on either side of each of these zones in an orientation suitable for processing TE and TM linear polarization, respectively.

The description below is given with reference to an x, y, z orthogonal frame of reference having origin O, in which the axis Ox extends perpendicularly to the mean plane of the substrate 100, the axis Oy extends parallel to the substrate 100 and perpendicularly to the longitudinal direction of the optical waveguide 110, and the axis Oz extends parallel to the substrate 100 and parallel to the optical waveguide 110.

As shown in accompanying FIG. 1, the waveguide 110 is rectilinear along the axis Oz. It is flush with one of the main surfaces 102 of the substrate 100. The waveguide 110 defines an inlet port 112 at one of its ends and an outlet port 114 at its other end (this definition of an inlet port 112 and an outlet port 114 is nevertheless arbitrary insofar as the device is symmetrical and consequently each of the ports 112 and 114 can equally well be an inlet port or an outlet port).

The optical waveguide 110 implanted in the plane substrate 100 is made in such a manner as to be capable of conveying only the two fundamental modes $TE_0$ and $TM_0$. These modes are polarized in respective directions Oy and Ox, as shown in FIG. 1.

Thus, the waveguide 110 is preferably of quadrangular right section, being square or rectangular, with facets that are respectively parallel and perpendicular to the axes Oy and Oz and to the main faces of the substrate 100.

The substrate 100 and the waveguide 110 are advantageously made using silica or a polymer material.

The nematic liquid crystal 200 possesses an ordinary refractive index $n_o$ that is less than the refractive index $n_g$ of the optical waveguide 110, and its possesses an extraordinary refractive index $n_e$ that is greater than $n_g$.

The anchoring of the liquid crystal 200 on the plate 100 and also on the facing interface plate (not shown in FIG. 1 in order to simplify the figure) must be weak so as to minimize the disturbance from the buffer layer of the liquid crystal at the interfaces when an electric field is applied that is high but less than the breakage electric field, or so as to diminish the value of the electric field that is applied when anchoring is broken, with this taking place when an appropriate voltage is applied across the electrode pairs 310 & 312 or 320 & 322.

The two active zones 210 and 220 of nematic liquid crystal are placed facing the waveguide 110. They are spaced apart in the Oz direction by a non-active zone 230. As can be seen in accompanying FIGS. 1 to 3, the width of the active zones 210 and 220 in the Oy direction is greater than the corresponding width of the waveguide 110.

Typically, each active zone 210 and 220 of liquid crystal is of quadrangular right section in the zOy plane.

The two electrodes 310 & 312 associated with the zone 210 are disposed respectively on either side of the liquid crystal in the Ox direction. In the absence of an electrical voltage across the electrodes 310 & 312, the molecules of the liquid crystal 210 are oriented parallel to the waveguide 110 in the Oz direction, as shown diagrammatically in FIG. 1. In contrast, when an appropriate voltage is applied across the electrodes 310 & 312, the molecules of the liquid crystal 210 situated between those electrodes become oriented perpendicularly to the long direction of the waveguide 110 in the Ox direction, as shown diagrammatically in FIG. 2.

Thus, applying a voltage across the electrodes 310 & 312 serves to decouple the TM-polarized component of the signal injected into the waveguide 110.

In practice, the two electrodes 310 and 312 can be supported respectively on the outside surface of the plate 100 and on the outside surface of the facing confinement plate.

The two electrodes 320 & 322 associated with the zone 220 are disposed respectively on either side of the liquid crystal in the Oy direction. In the absence of an electric voltage across these electrodes 320 & 322, the molecules of the liquid crystal 220 are oriented parallel to the waveguide in the Oz direction, as shown diagrammatically in FIG. 1. In contrast, when an appropriate voltage is applied across the electrodes 320 & 322, the molecules of the liquid crystal 220 situated between these electrodes become oriented perpendicularly to the long direction of the waveguide 110 in the Oy direction, as shown diagrammatically in FIG. 2.

Thus, applying a voltage across the electrodes 320 & 322 serves to decouple the TE-polarized component of the signal injected in the waveguide 110.

In practice, the two electrodes 320 and 322 can be supported directly by the plate 100.

Each active zone 210, 220 of liquid crystal thus serves to couple or decouple either the $TM_0$ mode or the $TE_0$ mode from the inlet port 112 going towards the outlet port 114 situated at the outlet of the optical waveguide 110, or vice versa.

In the absence of any applied voltage between the electrodes 310 & 312 or 320 & 322, the light signal injected via one of the ports 112 or 114 arrives in full at the port 114 or 112 situated at the other end of the waveguide 110. In contrast, in the presence of an appropriate electric field, the signal applied to the inlet of the waveguide 110 is decoupled, and consequently does not appear at the outlet.

By way of non-limiting example:

insertion losses for a 2×2 coupler are of the order of 0.5 decibels (dB) to 1 dB;

the width of the waveguide 110 in the Oy direction is about 4 micrometers ($\mu$m) to 8 $\mu$m;

the thickness of the waveguide 110 in the Ox direction is about 2 $\mu$m to 4 $\mu$m;

the thickness of the liquid crystal 200 between the plate 100 and the facing confinement plate is about 2 $\mu$m to 6 $\mu$m;

the length of each active zone 210, 220 of liquid crystal measured in the Oz direction is about 50 $\mu$m to 100 $\mu$m;

each active zone 210, 220 of liquid crystal is of a width in the Oy direction that is greater than the width of the waveguide 110, typically lying in the range 10 $\mu$m to 30 $\mu$m; and the electric field applied across the electrodes 310 & 312 or 320 & 322 is of the order of 3 volts per micrometer (V/$\mu$m) to 10 V/$\mu$m.

There follows a description with reference to FIGS. 4 to 7 of the basic structure of a light switch in accordance with the present invention having a 2×2 configuration, i.e. possessing two inlets and two outlets, the signal present on each of the two inlets being capable of being applied alternately to a selected one of the two outlets.

Naturally such a device could be used as a 1×2 switch if only one inlet of the device is used, with the structure of the device otherwise remaining identical to the means described below.

The 2×2 matrix is fabricated using two plane substrates 100, 400 that are symmetrical about the yOz plane. Each substrate 100, 400 possesses a respective implanted plane optical waveguide 110, 410. The two waveguides 110, 410 are comparable to the waveguide 110 described above. The two plane substrates 100, 400 are placed one above the other, with the two waveguides 110, 410 being parallel and superposed so as to constitute a vertical coupler. The two waveguides 110, 410 are thus separated by a liquid crystal medium 200.

This device also has the liquid crystal 200 split into two active zones 210, 220 that are spaced apart in the Oz direction along the waveguides 110 and 410, and it has the two pairs of electrodes 310 & 312 and 320 & 322.

The electrodes 310 & 312 spaced apart in the Ox direction and disposed respectively on opposite sides of the zone 210 can be carried by the outside surfaces of the plates 100 and 400 respectively, as can be seen in FIG. 4 for the electrode 310.

The electrodes 320 & 322 spaced apart in the Oy direction and placed on either side of the zone 220 are advantageously carried by the inside surfaces of the plates 100 and 400.

In practice, the thickness of the electrodes 320 & 322 can be equal to the width of the gap between the two plates 100 and 400, or each electrode can be subdivided into a group of electrodes of thickness smaller than said gap, respective smaller-thickness electrodes being adjacent to each of the plates 100, 400 and separated by a spacer (as shown in FIG. 8).

Naturally, under such circumstances, the control voltage (+v; −v) is applied both across the pair of electrodes 320*a* & 322*a* carried by the plate 100 and across the pair of electrodes 320*b* & 322*b* carried by the plate 400, so as to define electric fields oriented along the Oy direction.

Similarly, the electrodes 310 & 312 can be placed on the inside faces of the plates 100 and 400, and each electrode can be split into a group of electrodes of thickness smaller than the gap between the two plates 100, 400, the smaller-thickness electrodes being respectively adjacent to each of the plates 100, 400 and being carried thereby in the manner shown in FIG. 9. The control voltage (+v; −v) is then applied across the electrode pair 312*a* & 310*a* carried respectively by the plates 100 and 400 on one side of the zone 210, and by the electrode pair 312*b* & 310*b* carried respectively by the plates 100 and 400 on the other side of the zone 210, thereby defining electric fields oriented along the Ox direction.

Such electrodes 310*a*, 310*b*, 312*a*, 312*b*, 320*a*, 320*b*, 322*a*, and 322*b* are typically made of aluminum having thickness of about 100 nanometers (nm) to 500 nm. They are formed outside the waveguides 110, 410 so as to avoid absorbing the light signal.

The two inlet signals are injected into the two waveguides 110, 410 inserted in the plane substrates 100, 400, e.g. via inlet ports referenced 112 and 412 in the accompanying figures.

By selecting a liquid crystal 200 whose ordinary index $n_o$ is less than the index $n_g$ of the optical waveguides 110, 410 and whose extraordinary index $n_e$ is greater than $n_g$, it is possible to couple one of the linear TE or TM polarizations from the ports 112 and 412 to the outlet ports at the opposite ends 114 and 414 by using an active liquid crystal zone.

Two states (active and not active) are associated with each of the active liquid crystal zones 210 and 220, depending on whether or not an external electric field is applied to the liquid crystal zone in question by means of the electrodes 310 & 312, 320 & 322.

In the absence of an electric field (non-active state), the anchoring of the liquid crystals to the interfaces with the substrates 100, 400 determines the orientation of the liquid crystal in the volume. The liquid crystal molecules are thus oriented parallel to the Oz direction and to the longitudinal direction of the waveguides 110, 410, as can be seen in FIG. 6.

In the presence of an electric field (active state), the orientation of the liquid crystal in the volume is determined by the direction of the electric field applied across the substrates 310 & 312 or 320 & 322.

In the presence of such a field, in the zone 210 between the substrates 310 & 312, the liquid crystal becomes oriented in the Ox direction as shown in FIGS. 5 and 7, while in the zone 220 between the substrates 320 & 322, the liquid crystal becomes oriented along the Oy direction, as shown in FIG. 7.

In order to ensure that the light signals injected to the inlets 112 and 412 are transferred in full to the outlets 114 and 414, it is essential to couple both the TE and the TM polarizations. In order to do this, in the context of the invention, two active liquid crystal zones 210, 220 are used which are spaced apart by a non-active distance 230. The alignments selected for the liquid crystal and the directions of the applied electric fields are determined so as to define two liquid crystal zones that process the TE and the TM polarizations in succession.

Practical implementation of the two active zones 210, 220 of liquid crystal requires that the electrodes 310 & 312, 320 & 322 be installed so as to reorient electrically the nematic liquid crystal in each of these zones. The electrodes 320 & 322 are implanted on either side on the plane substrates 100, 400 for the active zone 220 processing TE polarization on either side of each of the optical waveguides 110, 410 (e.g. as shown in FIG. 8). This configuration for the electrodes makes it possible to obtain an electric field in the Oy direction and thus to reorient the liquid crystal in said direction. For the active zone 210 processing the TM polarization, the electrodes 310 & 312 are implanted beneath the optical waveguides 110, 410 so as to produce an electric field in the Ox direction, or else they are implanted on either side of the waveguides 110, 410, as shown in FIG. 9.

The liquid crystal 200 can be confined in at least two ways. The first way consists in filling the entire gap between the two plane substrates 100, 400 with liquid crystal 200. Under such circumstances, counter-electrodes define the boundaries between the active zones 210, 220 and the non-active zone 230 of the liquid crystal. The second way consists in using a medium of index that is lower than that of the optical waveguides 110, 410, said medium defining the boundaries of the active liquid crystal zones 210, 220.

In order to optimize coupling and minimize losses in the 2×2 switch, the plane optical waveguides 110, 410 made in the plane substrates 100, 400 are capable of propagating only the fundamental $TE_0$ and $TM_0$ modes. Thus, any incident polarization entering the ports 112 and 412 of the switch can propagate without loss in the switch. Since the $TE_0$ and $TM_0$ modes are normal modes, coupling one of these modes in one of the active liquid crystal zone 210, 220 has no influence on the other propagated mode. It is thus entirely possible to couple the $TE_0$ mode without disturbing propagation of the $TM_0$ mode in an active liquid crystal zone, and vice versa.

The 2×2 switch in accordance with the present invention operates entirely symmetrically relative to the inlet ports 112, 412 and the outlet ports 114, 414. This means that the light signals injected respectively to the inlets 112 and 412 cannot be switched to the same outlet port. Thus, for example, if the inlet signal injected into the inlet 112 is directed towards the outlet port 114, then the inlet signal injected to the inlet 412 is necessarily directed to the outlet port 414.

In order to minimize residual cross-over losses in the 2×2 switch (residual cross-talk losses), it is essential to minimize the depolarization of the $TE_0$ and $TM_0$ modes while the light signals pass through the two active liquid crystal zones 210, 220. Any depolarization constitutes loss by coupling to the wrong outlet port in a device of the type in accordance with the present invention that has two active zones in series. It is consequently essential to select a configuration for the active liquid crystal zones 210, 220 (i.e. alignment directions and reorientation directions of the liquid crystal) that is compatible with the directions specific to the TE and TM polarizations. Secondly, it is necessary to select an appropriate value for the liquid crystal anchoring energy. There generally exists a buffer layer in which the liquid crystal becomes progressively reoriented under the application of an external electric field. Such a buffer layer is shown diagrammatically in FIG. 10. The thickness of this buffer layer (coherent length) and its optical characteristics depend essentially on the anchoring force between the liquid crystal and the plane substrates. The most effective way of minimizing its influence on the coupling and thus of minimizing depolarization in the switch of the invention consists in using an anchoring force that is weak both in the zenith direction and in the azimuth direction relative to the plane substrates 100 and 400. This weak anchoring energy is selected so as to conserve an acceptable response time for the liquid crystal (t <20 milliseconds (ms)).

The structure described above is suitable for providing on/off switching of light signals between inlet ports and outlet ports by switching the orientation of liquid crystal molecules between a rest orientation in the Oz direction and orientations under applied voltage in the Oy and the Ox directions respectively.

Nevertheless, by applying voltage across the electrodes 310 & 312 and 320 & 322 that is less than the voltage required for achieving such on/off switching, the molecules are merely inclined away from the Oz direction respectively towards the Oy direction or the Ox direction. Under such circumstances, the inlet signals are not transferred in full to the outlets but they are merely attenuated.

The amplitude of the voltage applied across the substrates 310 & 312 and 320 & 322 can thus be used to control the attenuation of the light signals over the range 0 to 100%.

FIG. 11 is a diagram showing an intermediate configuration for the liquid crystal obtained with a voltage of amplitude controlled in this way so as to enable an attenuation effect to be obtained.

The present invention is not limited to making a switch or attenuation matrix having a 2×2 configuration. It extends to any other configuration of the N×N type or more generally of the N×P type.

Examples of N×N or N×P switches are shown in FIGS. 12 to 14.

An N×N or N×P switch matrix having a large number of ports is built up in a manner similar to building 2×2 matrices.

Such N×N switches comprise two plane substrates 100, 400 with a plurality of waveguides 110, 410 identical to those used in the 2×2 switches. Certain segments of the waveguides 110, 410 provided on the two substrates 100, 400 are placed facing one another. These segments are separated by pairs of active liquid crystal zones 210 & 220 each zone being associated with a pair of electrodes 310 & 312 and 320 & 322.

The junction between the various waveguides in the above-mentioned segments is preferably implemented by using curved waveguides that carry only the fundamental $TE_0$ and $TM_0$ modes.

According to a preferred characteristic of the invention, the switches made in this way advantageously comprise N(N−1)/2 individual 2×2 switches that are interconnected.

FIGS. 12 and 13 show in non-limiting manner two examples of N×N switches. In these figures, one of the substrates 100 and the associated waveguides 110 are represented by continuous lines. In contrast, the other substrate 400 and its associated waveguide 410 are sketched as dashed lines.

FIG. 12 shows an example of a 4×4 switch (i.e. a switch having four inlet ports and four outlet ports) in which six switch zones 200 are provided.

FIG. 13 shows an example of a 6×6 switch (i.e. six inlet ports and six outlet ports) in which 15 switch zones 200 are provided.

The illustrations and configurations shown in FIGS. 12 and 13 are not limiting.

In these figures, the N waveguides 110, 410 are provided in alternation on the two substrates 100, 400. For waveguides of rank 1 to N−1, the waveguide of rank $i$ is coupled via i-1 switches to a first waveguide of the other substrate and via $i$ switches to a second waveguide of said other substrate.

A variant embodiment of the switch as shown in accompanying FIG. 14 is described below.

The example given in FIG. 14 corresponds to a 3×3 switch. The structure shown in FIG. 14 is nevertheless easily generalizable to an N×N switch and more generally to an N×P switch.

In FIG. 14, one of the substrates 100 and the associated waveguides 110.1, 110.2, and 110.3 are drawn in continuous lines while the other substrate 400 and its associated waveguides 410.1, 410.2, and 410.3 are drawn as dashed lines.

Each waveguide 110, 410 has a plurality of segments that are not in alignment such that each waveguide 110 provided on the substrate 100 presents a segment facing each waveguide 410 provided on the second substrate 400.

For each assembly E comprising such a pair of facing segments of two waveguides 110, 410 belonging to the two different substrates 100, 400, there is to be found the same basic switch structure as described above comprising two separate active zones 210, 220 and two orthogonal pairs of electrodes 310 & 312 and 320 & 322.

For an N×P switch, there are thus NP such assemblies E. Each of these NP assemblies E can be controlled individually and separately from the other sets.

More precisely, the waveguides 110, 410 situated respectively on the two substrates 100 and 400 preferably extend in directions that are generally mutually orthogonal.

For example, the waveguides 110 of the substrate 100 extend between two mutually parallel edges 104 and 106 of the substrate.

The waveguides 410 of the substrate 400 extend between two mutually parallel edges 405 and 407 of the substrate 400, which edges are orthogonal to the above-mentioned edges 104, 106.

In addition, the waveguides 110, 410 are in a staircase configuration.

Thus, the waveguides 110 of the substrate 100 have rectilinear segments 111 that are orthogonal to the above-mentioned edges 104, 106 and that are interconnected by rectilinear segments 113 that are inclined relative to said edges 104, 106, and that are preferably at 45° relative thereto.

Similarly, the waveguides 410 of the substrate 400 comprise rectilinear segments 411 that are orthogonal to the above-mentioned edges 405, 407 and that are interconnected to one another by rectilinear segments 413 that are inclined relative to said edges 405, 407, preferably at 45° relative thereto, so that said segments 113 and 413 are parallel to one another and face one another.

The structure thus formed and shown in FIG. 14 enables the signal to be transferred from any one of the waveguides 110 to any one of the waveguides 410 (and vice versa) by appropriately controlling and passing through only one of the switch assemblies E.

Thus, in order to transfer a signal applied to the inlet of waveguide 110.1, to one of the waveguides 410.1, 410.2, or 410.3, it is appropriate to operate the corresponding switch assembly $E_{11}$, $E_{12}$, or $E_{13}$.

In order to transfer a signal applied to the inlet of waveguide 110.2 to one of the waveguides 410.1, 410.2, or 410.3, it is appropriate to operate the corresponding one of the switch assemblies $E_{21}$, $E_{22}$, or $E_{23}$.

More generally, in order to transfer a signal applied to the inlet of waveguide 110.i to a waveguide 410.j, it is necessary to operate the switch assembly $E_{ij}$.

Naturally, the present invention is not limited to the particular embodiments described above, but it extends to all variant embodiments coming within the spirit of the invention.

The above description relates to liquid crystals having positive dielectric anisotropy, in which the molecules of the liquid crystal orient themselves parallel to the applied electric field.

The person skilled in the art can easily adapt the orientations of the electrodes 310 & 312 and 320 & 322 for use with liquid crystals having negative dielectric anisotropy, in order to obtain the desired attenuation or switching, it being recalled that under such circumstances, the liquid crystal molecules orient themselves perpendicularly to the applied electric field.

What is claimed is:

1. An electro-optical device, comprising two plane optical substrates (100, 400) each having at least one optical waveguide (110, 410), and a nematic liquid crystal (200) inserted between them, in which the liquid crystal (200) is split into two separate active zones (210, 220) serving to control coupling and decoupling of a respective one of the TE and TM polarizations of a light signal injected into the waveguides (110, 410) wherein a first waveguide provided in one of the two substrates defines an inlet port and an outlet port and a second waveguide provided in the other of the two substrates defines at least one outlet port, so that a signal injected in the inlet port of the first waveguide outputs by the outlet port of one of the first waveguide and the second waveguide.

2. A device according to claim 1, wherein at least one of the two substrates possesses a plurality of optical waveguides (110, 410) each defining an inlet port (112, 412) and an outlet port (114, 414), corresponding to an N×P configuration.

3. A device according to claim 2, characterized by the fact that the two substrates (100, 400) define N(N−1)/2 switches.

4. A device according to claim 2, characterized by the fact that at least some of the waveguides (110, 410) possess curved segments.

5. A device according to claim 2, characterized by the fact that some of the segments of the waveguides (110, 410) provided on the two substrates (100, 400) are placed facing one another, these segments being separated by pairs of active liquid crystal zones (210, 220) each associated with a respective pair of electrodes (310 & 312 and 320 & 322).

6. A device according to claim 1, characterized by the fact that at least one of the substrates (100, 400) carries a plurality of waveguides (110, 410) and that each waveguide (110, 410) has various segments (111, 113, 411, 413) that are not in alignment but that each waveguide (110) provided on a first substrate (100) presents a segment (113) facing each waveguide (410) provided on the second substrate (400).

7. A device according to claim 6, characterized by the fact that each pair of facing segments of two waveguides (110, 410) defines an assembly with two separate active zones (210, 220) and two orthogonal pairs of electrodes (310 & 312; 320 & 322).

8. A device according to claim 6, characterized by the fact that the waveguides (110, 410) situated respectively on the two substrates (100, 400) extend in directions that are generally mutually orthogonal.

9. A device according to claim 6, characterized by the fact that each waveguide (110, 410) has a staircase configuration made up of mutually parallel rectilinear segments (111; 411) interconnected by segments (113, 413) that are inclined, preferably at 45°, relative to said parallel segments.

10. A device according to claim 1, characterized by the fact that it has at least one pair of electrodes (310 & 312; 320 & 322) disposed respectively on either side of the waveguide (110, 410), each of the electrodes (310 & 312; 320 & 322) being split into two groups of electrodes of thickness that is smaller than the gap between the two plates (100, 400) and respectively adjacent to each plate (100, 400).

11. A device according to claim 10, characterized by the fact that it has means suitable for applying an electric voltage firstly between a first pair of electrodes (312a & 310a) carried respectively by the two plates (100, 400), and secondly between a second pair of electrodes (312b & 310b) likewise carried respectively by the two plates (100, 400) so as to define electric fields oriented perpendicularly to the plates (100, 400).

12. A device according to claim 10, characterized by the fact that it has means suitable for applying an electrical voltage firstly across two electrodes (320a & 322a) carried by a first plate (100) and secondly between two electrodes (320b & 322b) carried by the second plate (400) so as to define electric fields oriented parallel to the plate.

13. A device according to claim 1, wherein each waveguide provided respectively on either one of the two substrates defines a respective inlet port (112, 412) and a respectively outlet port (114, 414) corresponding to a 2×2 configuration.

14. A device according to claim 1, characterized by the fact that it has two pairs of electrodes (310 & 312; 320 & 322) associated with respective ones of the two active liquid crystal zones (210, 220), the electrodes (310 & 312; 320 & 322) in each pair being disposed on respective opposite sides of the waveguide (110, 410), and the orientations of the electrodes (310 & 312; 320 & 322) being mutually orthogonal from one pair to the other.

15. A device according to claim 1 or claim 14, characterized by the fact that the waveguide (110) is rectilinear and flush with one of the main surfaces (102) of the substrate (100).

16. A device according to claim 1, characterized by the fact that the waveguide (110) is of quadrangular right section, square or rectangular, with facets that are respectively parallel and perpendicular to the main faces of the substrate (100), in such a manner as to allow only the fundamental $TE_0$ and $TM_0$ modes to propagate.

17. A device according to claim 1, characterized by the fact that the nematic liquid crystal (200) possesses an ordinary index $n_o$ that is lower than the index $n_g$ of the optical waveguide (110), and an extraordinary index $n_e$ that is greater than the index $n_g$ of the optical waveguide (110).

18. A device according to claim 1, characterized by the fact that the anchoring of the liquid crystal (200) on the plate (100) is weak.

19. A device according to claim 1, characterized by the fact that the liquid crystal (200) is confined by means of counter-electrodes defining the boundary between the active and non-active zones (210, 220; 230) of liquid crystal.

20. A device according to claim 1, characterized by the fact that the liquid crystal (200) is confined by means of a medium of index lower than that of the optical waveguide (110, 410), which medium defines the boundaries of the active liquid crystal zones (210, 220).

21. A device according to claim 1, characterized by the fact that it comprises N waveguides (110, 410) provided in alternation on two substrates (100, 400) for waveguides of ranks 1 to N−1, the waveguide of rank i being coupled via i-1 switches to a first waveguide of the other substrate and by i switches to a second waveguide of said other substrate.

22. A device according to claim 1, characterized by the fact that it has means suitable for applying a voltage across the electrodes (310 & 312, 320 & 322) associated with the two active liquid crystal zones (210, 220) suitable for controlling the orientation of the liquid crystal so as to form an optical attenuator.

23. A device according to claim 1, characterized by the fact that it has means suitable for applying electrical voltages across the electrodes (310 & 312, 320 & 322) associated with the two active liquid crystal zones (210, 220) sufficient either to reorient the liquid crystal, or to break the anchoring of the liquid crystal, so as to form a light switch.

* * * * *

UNITED STATES PATENT AND TRADEMARK OFFICE
CERTIFICATE OF CORRECTION

PATENT NO.        : 6,959,124 B2 Page 1 of 1
APPLICATION NO.   : 10/481224
DATED             : October 25, 2005
INVENTOR(S)       : Boissier et al.

It is certified that error appears in the above-identified patent and that said Letters Patent is hereby corrected as shown below:

Title Page:
In item [56], Other Publications, please delete the second occurrence of "Wilson T. et al..."

Signed and Sealed this

Sixth Day of March, 2007

JON W. DUDAS
*Director of the United States Patent and Trademark Office*